United States Patent

Hedlund et al.

(10) Patent No.: US 9,755,794 B2
(45) Date of Patent: Sep. 5, 2017

(54) METHODS AND ARRANGEMENTS FOR HANDLING A SCHEDULING OF A NARROWBAND TRANSMISSION IN A CELLULAR NETWORK (75) Inventors: Leo Hedlund, Alvsjo (SE); David Sandberg, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 70 days.

(21) Appl. No.: 14/116,622

(22) PCT Filed: May 10, 2011

(86) PCT No.: PCT/SE2011/050589
§ 371 (c)(1),
(2), (4) Date: Nov. 8, 2013

(87) PCT Pub. No.: WO2012/154095
PCT Pub. Date: Nov. 15, 2012

(65) Prior Publication Data
US 2014/0119333 A1    May 1, 2014

(51) Int. Cl.
*H04L 5/00* (2006.01)
*H04W 72/12* (2009.01)
*H04W 72/04* (2009.01)

(52) U.S. Cl.
CPC ....... *H04L 5/0007* (2013.01); *H04W 72/1205* (2013.01); *H04W 72/044* (2013.01); *H04W 72/1247* (2013.01); *H04W 72/1257* (2013.01)

(58) Field of Classification Search
USPC .................................................. 370/329–478
See application file for complete search history.

(56) References Cited

U.S. PATENT DOCUMENTS 7,970,001 B2 *  6/2011  Hoshino ............... H04L 1/0026
                                                              370/252
2006/0072604 A1 *  4/2006  Sutivong ............. H04W 74/002
                                                              370/437
(Continued)

FOREIGN PATENT DOCUMENTS

EP      1 804 536 A2    7/2007
WO      2009059431 A1   5/2009
(Continued)

OTHER PUBLICATIONS

International Preliminary Report on Patentability and Written Opinion, in corresponding International Application No. PCT/SE2011/050589, dated Nov. 12, 2013, 7 pages.

*Primary Examiner* — Charles C Jiang
*Assistant Examiner* — Kyaw Z Soe
(74) *Attorney, Agent, or Firm* — Rothwell, Figg, Ernst & Manbeck, P.C.

(57) ABSTRACT

A method in a base station for handling a scheduling of a narrowband transmission from a user equipment in a cell served by the base station is provided. The base station and the user equipment are comprised in a cellular network. A time resource available for the scheduling is divided into available subframes. A frequency resource available for scheduling in each respective subframe is divided into available resource blocks. The base station selects a subframe among the subframes available for scheduling. Narrowband transmissions are to be prioritized for scheduling to the selected subframe. The base station schedules the transmission to a subset of the available resource blocks in the selected subframe when an indication that the transmission from the user equipment is a narrowband transmission is obtained.

14 Claims, 6 Drawing Sheets (56) References Cited

U.S. PATENT DOCUMENTS

| | | | |
|---|---|---|---|
| 2006/0126558 A1* | 6/2006 | Lee | H04W 36/14 370/329 |
| 2007/0230376 A1* | 10/2007 | Park | H04W 16/02 370/294 |
| 2009/0122777 A1* | 5/2009 | Tao | H04B 7/061 370/343 |
| 2009/0185476 A1* | 7/2009 | Tsai | H04L 27/2602 370/210 |
| 2010/0157924 A1* | 6/2010 | Prasad | H04W 52/346 370/329 |
| 2010/0238896 A1* | 9/2010 | Sutivong | H04W 74/002 370/330 |
| 2011/0130099 A1* | 6/2011 | Madan | H04W 72/1226 455/63.1 |
| 2011/0183679 A1* | 7/2011 | Moon | H04W 72/082 455/450 |
| 2013/0051359 A1* | 2/2013 | Skarby | H04W 72/1226 370/330 |
| 2013/0322395 A1* | 12/2013 | Kazmi | H04W 72/082 370/329 |
| 2015/0085797 A1* | 3/2015 | Ji | H04J 3/16 370/329 |

FOREIGN PATENT DOCUMENTS

| | | | |
|---|---|---|---|
| WO | 2010135720 A1 | 11/2010 | |
| WO | 2011028368 A1 | 3/2011 | |

* cited by examiner

METHODS AND ARRANGEMENTS FOR HANDLING A SCHEDULING OF A NARROWBAND TRANSMISSION IN A CELLULAR NETWORK

CROSS REFERENCE TO RELATED APPLICATION(S)

This application is a 35 U.S.C. §371 National Phase Entry Application from PCT/SE2011/050589, filed May 10, 2011, designating the United States, the disclosure of which is incorporated herein in its entirety by reference.

TECHNICAL FIELD

Embodiments herein relate to a base station and a method in a base station. In particular, embodiments herein relate to handling a scheduling of a narrowband transmission.

BACKGROUND

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, a base station as described above will be referred to as a base station or a Radio Base Station (RBS). A user equipment as described above, will in this disclosure be referred to as a user equipment or a UE.

The expression DownLink (DL) will be used for the transmission path from the base station to the user equipment. The expression UpLink (UL) will be used for the transmission path in the opposite direction i.e. from the user equipment to the base station.

Cellular communication networks evolve towards higher data rates, together with improved capacity and coverage. In 3GPP, standardization body technologies like GSM, HSPA and LTE have been and are currently developed.

LTE uses a radio access technology based on Orthogonal Frequency Division Multiplexing (OFDM) for downlink transmissions and based on Single Carrier Frequency Division Multiple Access (SC-FDMA) for uplink transmissions. The resource allocation to user equipments on both downlink and uplink may be performed adaptively by the concept of so called fast scheduling, taking into account the instantaneous traffic pattern and radio propagation characteristics of each user equipment. Assigning resources in both downlink and uplink may be performed in a scheduler situated in a base station, which base station is in LTE referred to as an eNodeB.

A problem is that it may be difficult for the base station to schedule the transmissions to obtain satisfactory quality of service in the cellular network. For example, one challenge for the scheduler is to maximize the throughput for the user equipments experiencing the worst channel quality and at the same time achieve a high total throughput.

In LTE, the time domain is divided into subframes, where one subframe of 1 ms duration is further divided into 12 or 14 OFDM (or SC-FDMA) symbols, depending on the configuration. One OFDM (or SC-FDMA) symbol comprises a number of sub carriers in the frequency domain, depending on the channel bandwidth and configuration. One OFDM, or SC-FDMA, symbol on one sub carrier is referred to as a Resource Element (RE). A set of resource elements covering a number of sub carriers and symbols, in the frequency and time domain respectively, make up a Physical Resource Block (PRB).

With the introduction of OFDM and SC-FDMA the possibility to utilize Frequency Selective Scheduling (FSS) emerged. A frequency selective scheduler typically uses estimates of the instantaneous channel quality towards each user equipment in the frequency domain and aims at allocating favorable PRBs to each user equipment. Frequency selective scheduling may be beneficial since it may improve the Signal-to-Interference-and-Noise-Ratio (SINR), thus giving a gain particularly for user equipments in poor channel conditions.

A problem, however, is that since the each uplink transmission using SC-FDMA needs to be scheduled to contiguous PRBs in the frequency domain, the frequency resources may become fragmented, which further increases the difficulties in performing efficient scheduling.

Moreover, the assignments for the uplink and the downlink are transmitted in a control region covering a few OFDM symbols in the beginning of each downlink subframe. The downlink data is transmitted in a data region covering the rest of the OFDM symbols in each downlink subframe. The assignments in the control region are carried by the Physical Downlink Control Channel (PDCCH). PDCCH is a shared resource between uplink and downlink, meaning that if many assignments are transmitted for the uplink, fewer may be sent for the downlink, and vice versa.

Hence, a further problem is that inefficient scheduling of uplink signals may reduce the possibility of efficient scheduling of downlink transmissions.

SUMMARY

In view of the discussion above, it is an object for embodiments herein to provide an improved way of handling a scheduling.

According to a first aspect, the object is achieved by a method in a base station for handling a scheduling of a narrowband transmission from a user equipment in a cell served by the base station. The base station and the user equipment are comprised in a cellular network. A time resource available for the scheduling is divided into available subframes. A frequency resource available for scheduling in each respective subframe is divided into available resource blocks. The base station selects a subframe among the subframes available for scheduling. Narrowband transmissions are to be prioritized for scheduling to the selected subframe. The base station schedules the transmission to a subset of the available resource blocks in the selected subframe when an indication that the transmission from the user equipment is a narrowband transmission is obtained.

According to a second aspect, the object is achieved by a base station for handling a scheduling of a narrowband transmission from a user equipment in a cell served by the base station. The base station and the user equipment are comprised in a cellular network. A time resource available for the scheduling is divided into available subframes. A frequency resource available for scheduling in each respective subframe is divided into available resource blocks. The base station comprises a selecting unit configured to select a subframe among the subframes available for scheduling. Narrowband transmissions are to be prioritized for scheduling to the selected subframe. The base station comprises a scheduler. The scheduler is configured to schedule the transmission to a subset of the available resource blocks in the selected subframe when an indication that the transmission from the user equipment is a narrowband transmission is obtained.

By selecting subframes wherein narrowband transmissions are to be prioritized, narrowband transmissions can be concentrated in other subframes than transmissions using the whole frequency band, and hence problems due to frequency fragmentation can be reduced. This provides an improved way of handling scheduling.

DETAILED DESCRIPTION

Figure 1:
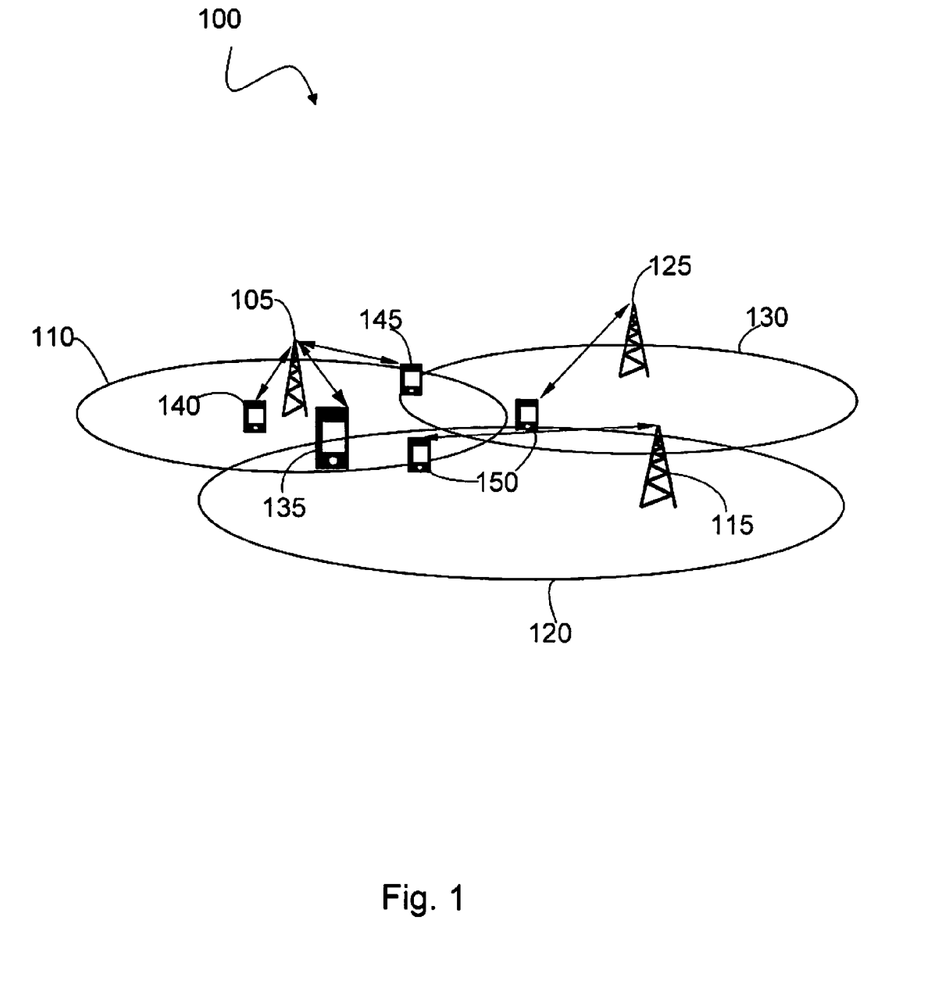
FIG. 1 is a schematic block diagram illustrating an embodiment of a cellular network.

FIG. 1 depicts a cellular network 100. The cellular network 100 may be a LTE cellular network, a WCDMA cellular network, a GSM cellular network, any 3GPP cellular network, or any other cellular network.

The cellular network 100 comprises a base station 105 serving a cell 110. The cellular network 100 further comprises a further base station 115 serving a further cell 120, and a further base station 125 serving a further cell 130. The base station 105 and the further base stations 115 and 125 are in this example eNBs, but may in other embodiments be of another type and may in different embodiments be referred to by different names such as for example RBS, eNodeB, NodeB, B node, or BTS, depending on the technology and terminology used. The base stations 105, 115 and 125 may in some embodiments be of different classes such as e.g. macro eNodeB, home eNodeB or pico base station.

The cellular network 100 further comprises a user equipment 135, which is located in the cell 110 served by the base station 105. The user equipment 110 is located at the edge of the cell 110, and may hence be referred to as a cell-edge user equipment. A further user equipment 140 is located near the center of the cell 110, closer to the serving base station 105. The further user equipment 140 may hence be referred to as a cell-center user equipment. A further cell-edge user equipment 145, which is also served by the base station 105 is depicted in the cell 110. Each base station 115 and 125 also serves a respective further cell-edge user equipment 150.

The user equipments 135, 140, 145 and 150 may be for example communication devices such as mobile telephones, cellular telephones, laptops, or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

As part of the development towards embodiments herein, a problem will first be identified and discussed below, with reference to FIG. 1.

With the introduction of OFDM and SC-FDMA the possibility to utilize frequency selective scheduling emerged, as previously mentioned. A frequency selective scheduler may typically use estimates of the instantaneous channel quality in the frequency domain towards each user equipment it is serving, and aims at allocating favorable resource blocks to each of them. Since frequency selective scheduling improves the SINR, it primarily gives a gain for user equipments in poor channel conditions.

In the following description of a typical frequency selective scheduler, the term PRB is, by way of example, used for a resource block.

A frequency selective scheduler may be weight-based, meaning that a weight is assigned to each PRB for each user equipment. For a purely channel quality based scheduling strategy the weight is only dependent on the channel quality for user equipment i on PRB j. The weight for a given user equipment is then equal to the sum of the PRB weights for all PRBs that are allocated to the user equipment. Resource allocation is done in a way that tries to maximize the sum of all user equipments' weights, sumWeight, according to the equation $$sumWeight = \sum_i \sum_j allocationMap_{i,j} \cdot prbWeight_{i,j}$$

where $prbWeight_{i,j}$ is the PRB weight for a user equipment i on PRB j, and $allocationMap_{i,j}$ is a bitmap where '1' indicate that PRB j is allocated to user equipment i.

In LTE, each user equipment may calculate its output power using the power control equation specified by 3GPP. A little bit simplified it may be expressed as $$P_{TX} = \min(P_{MAX}, P_0 + 10 \cdot \log 10(N_{PRB}) + \alpha \cdot PL)$$

where $P_{TX}$ is the user equipment output power expressed in dBm, $P_{MAX}$ is the maximum user equipment output power expressed in dBm, $P_0$ is the power control target expressed in dBm per PRB, $N_{PRB}$ is the bandwidth that the user equipment is transmitting over, a is the pathloss compensation factor, and PL is the pathloss, expressed in dB, measured by the user equipment.

For a cell-edge user equipment, which is likely to transmit at its maximum power, there is a dependency between the bandwidth and the transmit Power Spectral Density (PSD) according to $$PSD_{TX} = P_{MAX} - 10 \cdot \log 10(N_{PRB}) \text{ [dBm/PRB]}$$

This means that for a cell-edge user equipment, such as for example the user equipment 135 and the further user equipments 145 and 150 in FIG. 1, the total output power will be split over the transmission bandwidth, causing a lower Signal-to-Interference-and-Noise-Ratio (SINR) at the receiver of the respective serving base station.

To increase the SINR at the receiver, the scheduler may choose to allocate the user equipment with a narrow bandwidth and it may also select a part of the frequency band where the channel quality is highest. For cell-edge user equipments, the transmission bandwidth may therefore be limited by the available transmission power, and a too wide allocated bandwidth for these user equipments may result in a too low SINR.

Because cell-edge user equipments have low SINR, they are also the ones to gain the most from an increased SINR due to e.g. frequency selective scheduling. Cell-edge user equipments may typically not utilize the full system bandwidth, and a relatively small increase in SINR leads to a large reduction in the number of PRBs that is required to transmit a certain amount of data.

On the other hand, cell-center user equipments, such as for example the further user equipment 140 in FIG. 1, have relatively good SINR to start with, and therefore they primarily need more bandwidth to be able to transmit more data. An SINR increase for these user equipments will therefore not improve the performance significantly.

Since the LTE uplink uses SC-FDMA, it requires contiguous frequency allocations. When a cell-edge user equipment is scheduled over a small part of the system bandwidth, the spectrum is likely to be fragmented and difficult to use efficiently for cell-center user equipments. First of all, there has to be other user equipments in the cell with data to transmit. Also, since PDCCH is a limited resource which is shared between uplink and downlink, scheduling of many user equipments in the uplink may tend to degrade the efficiency of the downlink. Therefore, there is a tradeoff between SINR gain for cell-edge user equipments and frequency utilization. That is, when cell-edge user equipments are scheduled on their respective channel quality peaks, the frequency utilization is decreased. On the other hand, if cell-edge user equipments are scheduled without consideration of their channel quality peaks, the transmission will be less efficient and will allocate more bandwidth and ultimately the connection is lost.

Figure 2:
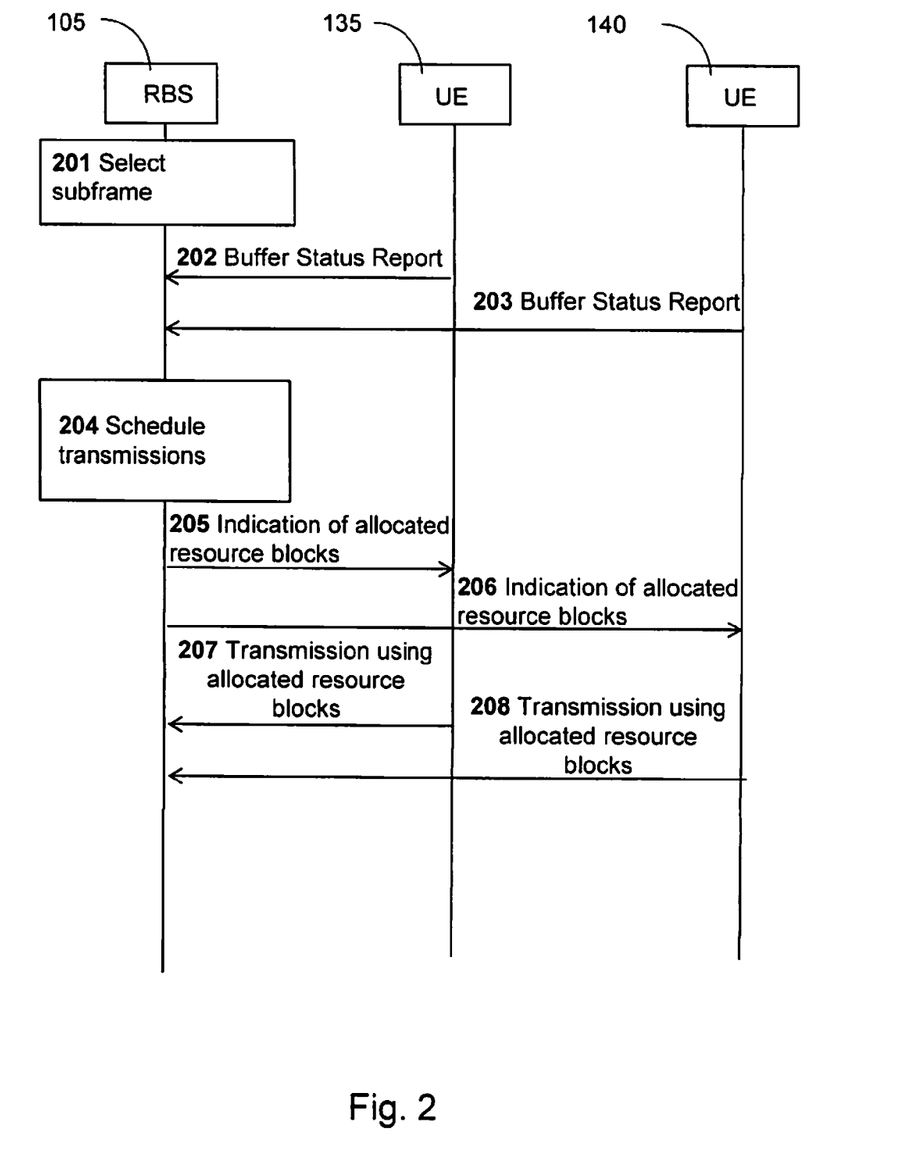
FIG. 2 is a combined signalling scheme and flowchart illustrating embodiments in a cellular network.

FIG. 2 illustrates how a method in the base station 105 for handling a scheduling of a narrowband transmission from the user equipment 135 in the cell 110 served by the base station 105 may be implemented in the cellular network 100 according to some embodiments herein.

As previously mentioned, the base station 105 and the user equipment 135 are comprised in the cellular network 100.

A time resource is available for the scheduling. The time resource is divided into available subframes. A frequency resource is available for scheduling in each respective subframe. The frequency resource is divided into available resource blocks. The method comprises the following actions, which may in other embodiments be taken in another suitable order.

In action 201, the base station 105 selects at least one subframe in which narrowband transmissions are to be prioritized in the scheduling.

By narrowband transmission is understood a transmission that is performed, or is to be performed over only a part of the available frequency band, i.e. over a subset of the available resource blocks. A transmission may be narrowband for example due to the user equipment in question being a cell-edge user equipment, but also for example because the amount of data to be transmitted is so small that the whole frequency band is not needed to transmit it.

By dedicating some subframes to narrow bandwidth transmissions according to embodiments herein, the frequency resources, i.e. the available resource blocks will be more efficiently used.

Moreover, since cell-edge user equipments will be prioritized in these selected subframes they do not have to compete with wide bandwidth transmissions from for example cell-center user equipments, and it will be easier to schedule these cell-edge user equipments to resource blocks where their respective channels experiences channel quality peaks.

Also, since other transmissions that are scheduled to the selected subframes will also be relatively narrowband, problems due to spectrum fragmentation will decrease.

In action 202, the base station 105 receives a buffer status report from the user equipment 135. The buffer status report is an indicator of a current buffer status of the user equipment 135, i.e. of how much data the user equipment 135 has to transmit on the uplink. A low buffer status in the buffer status report from the user equipment 135 may be an indication to the base station 105 that the transmission to be scheduled from the user equipment 135 is a narrowband transmission.

The base station 105 may also receive a so called Power Headroom Report (PHR) from the user equipment 135. The power headroom is an indicator of the uplink power situation relative the maximum power level of the user equipment transmitter. A small power headroom in the power headroom report from the user equipment 135 may be an indication to the base station 105 that the transmission power is insufficient. Hence, in order to get a SINR that is sufficiently high for data detection, the base station 105 scheduler is forced to schedule a narrowband transmission from the user equipment 135. Thereby, in this example, an indication that the transmission to be scheduled from the user equipment 135 is a narrowband transmission is obtained. A narrowband transmission will have the effect that the available transmission power in the user equipment 135 is concentrated on only a few resource blocks yielding a higher transmit spectral density and therefore also a higher SINR on the receiver side. In this example, the power headroom is small, indicating that the user equipment 135 will transmit at a power level which is close to its maximum output power.

The base station 105 may also utilize a so called channel quality measurement for the user equipment 135. The channel quality measurement indicates how the channel quality varies over the available frequency band.

In action 203, the base station 105 receives a buffer status report from the user equipment 140, indicating that this user equipment too has uplink data waiting to be transmitted. In this example, the buffer status from the further user equipment 140 indicates that it is a rather large amount of data in the buffer that may not be transmitted in a narrow bandwidth transmission.

In this example, the base station 105 also receives a power headroom report from the user equipment 140. For the user equipment 140, the power headroom is large, indicating that the user equipment 140 is not power limited, and thus may utilise the full bandwidth for its transmission.

Hence, for the user equipment 140, there is no indication that the transmission waiting to be scheduled is a narrowband transmission.

In action 204, the base station 105 schedules the transmissions from the user equipment 135 and 140.

Based on the indication that the transmission to be scheduled from the user equipment 135 is a narrowband transmission, this transmission is scheduled to a subset of the resource blocks in the selected subframe, where narrowband transmissions are to prioritized.

In this example, frequency selective scheduling is performed based on the reported channel quality for the user equipment 135. The base station 105 thus schedules the transmission from the user equipment 135 to a subset that is favourable with regards to the channel quality.

The transmission from the further user equipment 140 is, based on the indication that this is not a narrowband transmission, scheduled to all the resource blocks, i.e. to the entire available frequency band, in another subframe than the selected subframe, since it is not to be prioritized in the selected subframe.

One way of implementing the above scheduling in the base station 105 if the base station has a weight based scheduler of the previously described type, may be to, in the selected subframes where narrowband transmissions are to be prioritized, set a weight bonus that is inversely proportional to the number of resource blocks, e.g. PRBs, ($N_{PRB}$), that the user equipment in question is expected to be able to utilize for its transmission.

This weight bonus may then be used to give extra priority to narrowband transmissions according to $$sumWeight = \sum_i \sum_j allocationMap_{i,j} \cdot (prbWeight_{i,j} + cellEdgeBonus_i)$$

where cellEdgeBonus, is the bonus that is given to user equipment i, defined by $$cellEdgeBonus_i = \frac{\beta}{N_{PRB,i}}$$

and $\beta$ is a weight factor for the cell-edge bonus, $prbWeight_{i,j}$ is the PRB weight for user equipment i on PRB j, and $allocationMap_{i,j}$ is a bitmap where '1' indicate that PRB j is allocated to user equipment i.

The estimate of the number of PRBs that a user equipment is likely to be able to utilize efficiently, may for example be calculated using the power headroom report, and this measure may also be used to indicate if a user equipment is cell-edge, $N_{PRB}$ may then typically be small, or cell-center, $N_{PRB}$ may then typically be large.

According to 3GPP, power headroom is reported by the user equipment as the difference, expressed in dB, between the user equipment maximum output power expressed in dBm, and the wanted output power expressed in dBm. The metric may be calculated as $$N_{PRB} = N_{PRB,PHR} + 10^{PHR/10}$$

where PHR is the power headroom, expressed in dB, reported by the user equipment and $N_{PRB,PHR}$ is the number of PRBs that was used when the PHR was transmitted.

In action 205, the base station 105 transmits an indication of the subframe, and the resource block(s), to which the transmission has been scheduled to the user equipment 135, to enable the user equipment to perform the transmission.

In action 206, the base station 105 transmits an indication of the subframe, and the resource block(s), to which the transmission to be performed by the further user equipment 140 has been scheduled.

In action 207 the user equipment 135 performs its transmission using the allocated resource blocks to which it has been scheduled.

In action 208 the user equipment 140 performs its transmission using the allocated resource blocks to which it has been scheduled.

Due to the behaviour of uplink power control, user equipments transmitting with a narrow bandwidth typically transmits with a higher Power Spectral Density (PSD) than user equipments transmitting with a wider bandwidth.

According to embodiments herein, cell-edge user equipments will likely be prioritized in the selected subframes. Subframes where many cell-edge user equipments are scheduled may have a higher total transmit power than subframes where cell-center user equipments are scheduled. This may hence result in more inter-cell interference in the selected subframes where many cell-edge user equipments are scheduled.

By using static coordination between cells, such as for example the cells 110, 120, 130 in the cellular network 100, the cell-edge user equipments 135, 145 in the cell 110 may, according to some embodiments herein, be scheduled by the base station 105 to another subframe than subframes that the cell edge user equipments 150 in the neighbouring cells 120, 130 are scheduled to by their respective serving base stations 115, 125. This may for example be realized by, in action 201 described above, selecting a subframe that fulfils the following:

subframeIndex mod 3==PCI mod 3 where subframeIndex is the index of a current subframe relative to some system time reference, PCI is the Physical Cell ID for the cell, and mod denotes the modulo operator.

Such coordination, or multiplexing of selected subframes, may decrease the total interference power from neighbouring cells when cell-edge user equipments are scheduled. Since cell-edge user equipments have low SINR they will also gain the most from the increased SINR due to reduced inter-cell interference.

In some embodiments, the coordination may be performed to schedule cell-edge user equipments in one cell to the same subframe as cell-center user equipment are scheduled to in another, neighbouring, cell.

Figure 3:
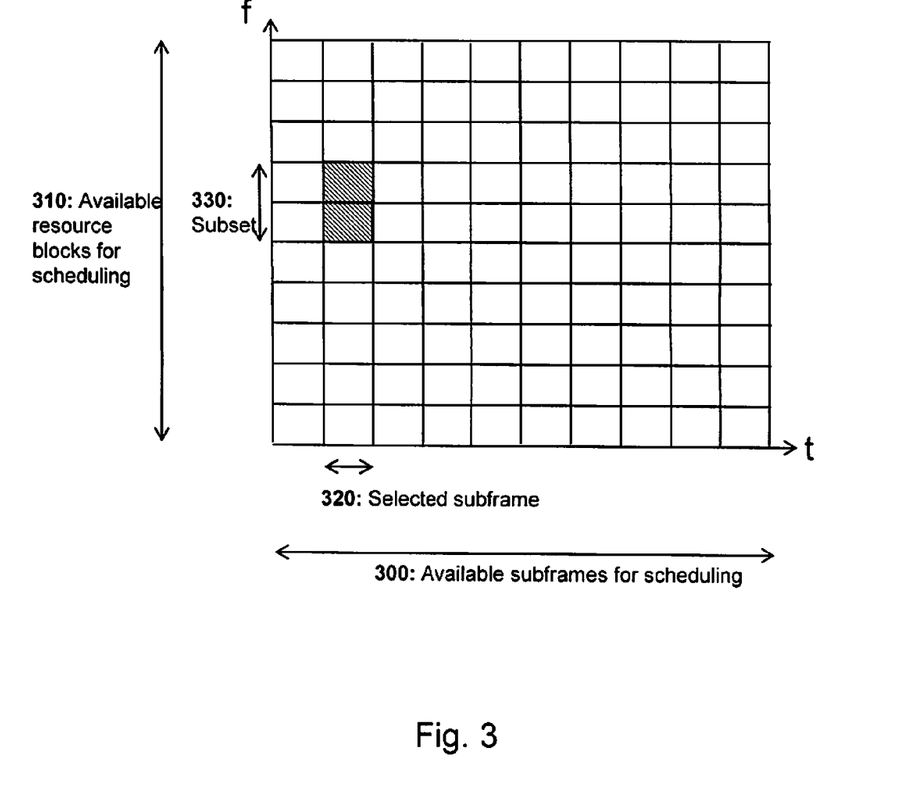
FIG. 3 is a schematic illustration an embodiment of available resources for scheduling.

FIG. 3 is a schematic illustration, by way of example, of time resources and frequency resources that may be available for scheduling. In the time domain, corresponding to the x-axis denoted t, the resources are divided into subframes. In the frequency domain, corresponding to the y-axis denoted f, the available resources are divided into resource blocks, such as for example PRBs. 300 indicates the available subframes. 310 indicates the available resource blocks. The illustration further illustrates how a subframe 320 may be selected among the available subframes 300, and how a subset of resource blocks 330 may be selected for scheduling among the available resource blocks for the selected subframe 320. It is to be understood that the terms subframe and resource block are to be interpreted as general terms for the respective resource portions that the scheduler may allocate, and that the terminology for such subframes and resource blocks may vary depending on the technology and terminology used. The number of subframes, and resource blocks available for scheduling may also vary between various embodiments herein.

Figure 4:
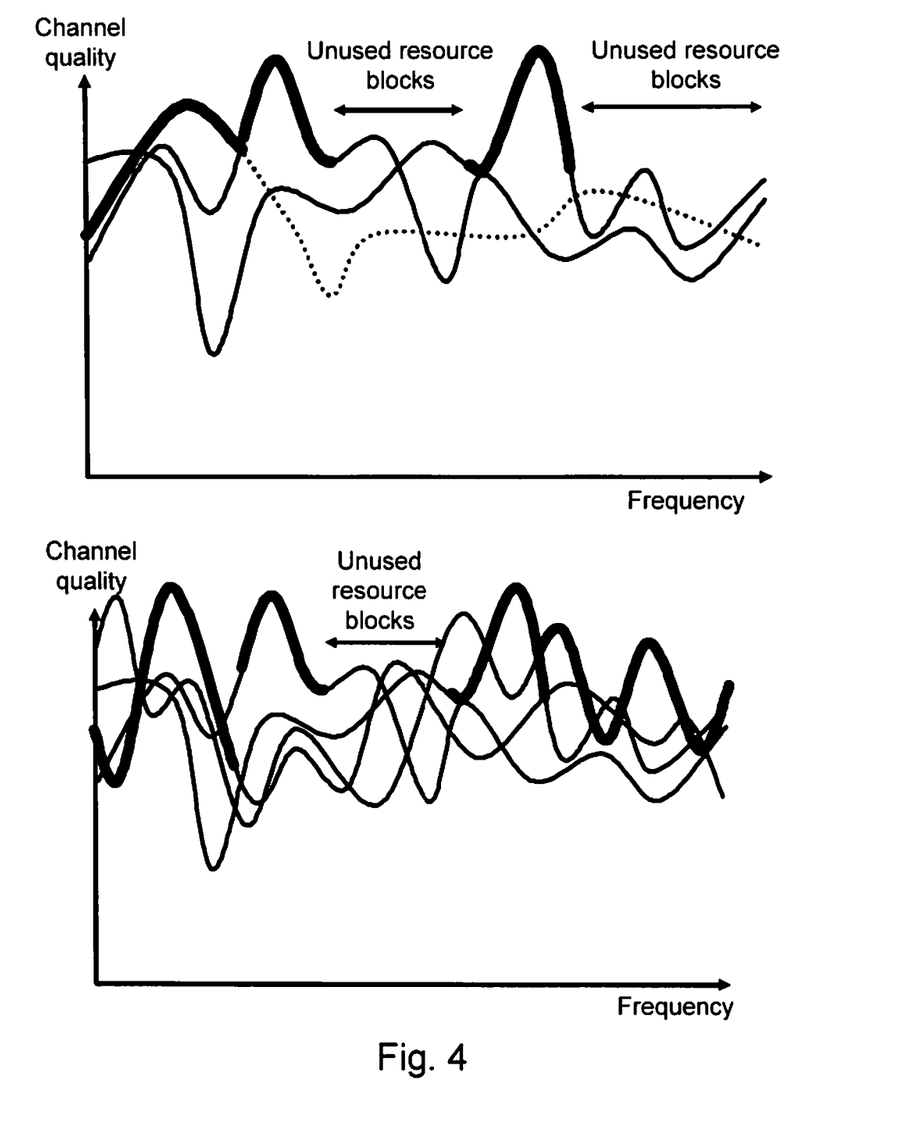
FIG. 4 is a schematic illustration of a scheduling result.

FIG. 4 schematically illustrates two examples of scheduling of several user equipment transmissions in one subframe, wherein the transmission needs to be performed on contiguous frequencies, such as for example for LTE uplink transmissions as previously described.

In the top diagram, the previously described problem with frequency fragmentation is illustrated. A respective channel quality variation of two cell-edge user equipments is indicated by the continuous lines, and a channel quality variation of a cell-center user equipment is illustrated by the dotted line. The thick parts of the respective lines correspond to a respective scheduled transmission.

In the example in the top diagram, the uplink gets 3 PDCCH resources. The two cell-edge user equipments are scheduled at their channel quality peaks by performing frequency selective scheduling. When the cell-center user equipment was to be scheduled, the frequency resource had been fragmented by the scheduled cell-edge transmissions. This leads to unused spectrum in the illustrated subframe, since the cell-center user equipment could only be scheduled to a narrow bandwidth at an end of the frequency band because it required contiguous frequency allocations, and the whole frequency band could not be allocated to it due to the fragmentation. The unused spectrum is indicated by the two arrows.

In the bottom diagram, it is illustrated how the situation in the top diagram may be avoided according to some embodiments herein, by selecting the illustrated subframe and scheduling only narrow bandwidth transmissions therein. In this example, the uplink gets four PDCCH resources, hence four cell-edge user equipments may then be scheduled to resource blocks in the illustrated subframe, for which they have good channel quality, and the spectrum is still utilized reasonably well.

Hence, FIG. 4 further illustrates schematically that some embodiments herein may result in a reduced a number of unused resource blocks, i.e in an improved spectrum utilisation.

Figure 5:
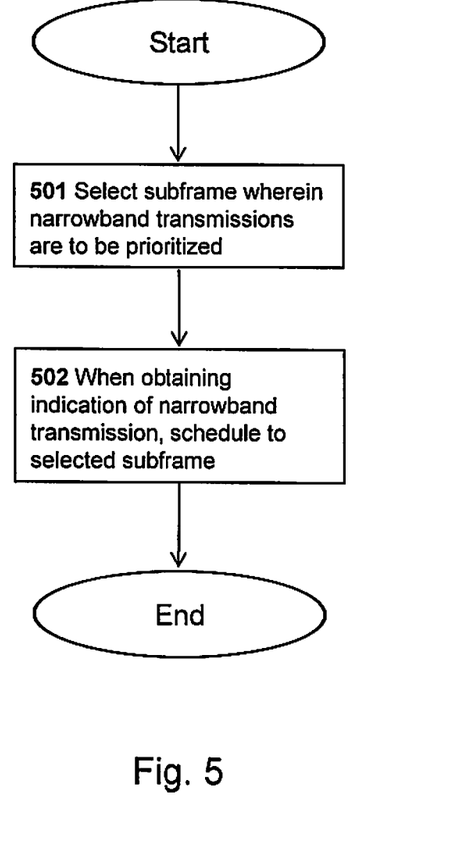
FIG. 5 is a flowchart depicting embodiments of a method in a base station.

Embodiments herein, relating to a method in the base station 105 for handling a scheduling of a narrowband transmission from the user equipment 135 in the cell 110 served by the base station 105 will now be further elaborated and described with reference to the flowchart depicted in FIG. 5. These embodiments will be described in a more general way. As previously mentioned, the base station 105 and the user equipment 135 are comprised in the cellular network 100. The time resource 300 available for the scheduling is divided into available subframes. The frequency resource 310 available for scheduling in each respective subframe is divided into available resource blocks. The cellular network 100, the base station 105, and the user equipment 135 may be of any of the previously described types. The method comprises the following actions, which actions may be taken in any suitable order.

In action 501 the base station 105 selects a subframe 320 among the subframes available for scheduling. Narrowband transmissions are to be prioritized for scheduling to the selected subframe 320. More than one subframe may be selected.

In some embodiments, only narrowband transmissions are to be scheduled to the selected subframe.

In some embodiments, the narrowband transmissions are prioritised for scheduling to the selected subframe 320 based on the number of resource blocks they are to be scheduled to.

In some embodiments, the selecting is performed such that the selected subframe 320 does not overlap a further selected subframe of a further cell 120, 130 comprised in the cellular network 100.

This reduces inter-cell interference experienced by cell-edge user equipments. Since user equipments on the cell-edge usually transmits with the highest power spectral density, this may lead to a higher total transmit power in the selected subframes, where cell-edge user equipments are likely to be scheduled since narrowband transmissions are prioritized in these subframes. By time multiplexing the scheduling of cell-edge user equipments in neighbouring cells, e.g. by time multiplexing the selected subframe 320 with a further selected subframe of the further cells 120, 130, the inter-cell interference experienced by the user equipments that are most susceptible to inter-cell interference is reduced.

In action 502 the base station 105 schedules the transmission to a subset 330 of the available resource blocks in the selected subframe 320 when an indication that the transmission from the user equipment 135 is a narrowband transmission is obtained.

In some embodiments, the subset 330 is contiguous, and the transmission is scheduled to the subset 330 based on a channel quality variation among the available resource blocks in the selected subframe 320.

Contiguous subsets may be required for example in LTE uplink and WIMAX. Thanks to the prioritising of narrowband transmissions in selected subframes, the risk of inefficient scheduling due to fragmentation of the frequency band is reduced, and several narrowband transmissions may be scheduled to contiguous subsets in the selected subframe. Hence, according to some embodiments herein, frequency utilization in the uplink may be improved for example when frequency selective scheduling is performed. This may be useful when a mix of cell-edge user equipments 135, 145 and cell-center 140 user equipments are to be scheduled in the cell 110.

In some embodiments, the indication is at least one of a power headroom of the user equipment 135 and a previous number of resource blocks used by the user equipment 135 and a buffer status of the user equipment 135.

In some embodiments, the transmission is narrowband due to the user equipment 135 being power limited. The indication may then be at least one of a channel quality measurement of the user equipment 135 and a power headroom of the user equipment 135.

In some embodiments, the transmission is narrowband due to a data amount to be transmitted from the user equipment 135. The indication may then be a buffer status of the user equipment 135. As previously mentioned, a low buffer status may indicate that the buffer may be emptied using only a narrowband transmission. This may be the case both for cell-edge and cell-center user equipments.

Figure 6:
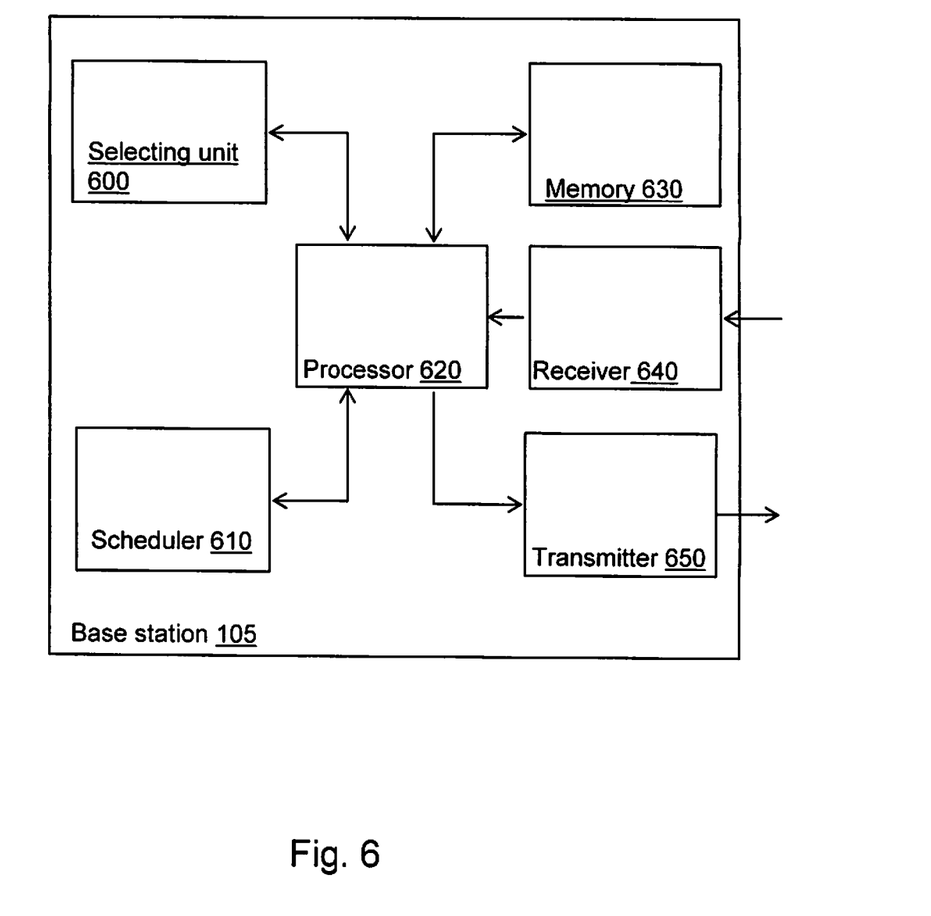
FIG. 6 is a schematic block diagram illustrating embodiments of a base station.

To perform the actions above for handling a scheduling of a narrowband transmission from the user equipment 135 in the cell 110 served by the base station 105, the base station 105 comprises an arrangement schematically depicted in FIG. 6. As mentioned above, the base station 105 and the user equipment 135 are comprised in the cellular network 100. As also previously mentioned, a time resource 300 available for the scheduling is divided into available subframes and a frequency resource 310 available for scheduling in each respective subframe is divided into available resource blocks.

The term "configured to" used herein may also be referred to as "arranged to".

The base station 105 comprises a selecting unit 600. The selecting unit 600 is configured to select a subframe 320 among the subframes available for scheduling. Narrowband transmissions are to be prioritized for scheduling to the selected subframe 320.

In some embodiments, narrowband transmissions are prioritized for scheduling to the selected subframe 320 based on the number of resource blocks they are to be scheduled to.

In some embodiments, the selecting unit 600 is further configured to perform the selecting such that the selected subframe 320 does not overlap a further selected subframe of a further cell 120, 130 comprised in the cellular network 100.

The base station 105 further comprises a scheduler 610. The scheduler 610 is configured to schedule the transmission to a subset 330 of the available resource blocks in the selected subframe 320 when an indication that the transmission from the user equipment 135 is a narrowband transmission is obtained.

In some embodiments, the subset 330 is contiguous, and the scheduler 610 is further configured to schedule the transmission to the subset 330 based on a channel quality variation among the available resource blocks in the selected subframe 320.

In some embodiments, the indication is at least one of a channel quality measurement of the user equipment 135 and a power headroom of the user equipment 135 and a previous number of resource blocks used by the user equipment 135 and a buffer status of the user equipment 135.

According to some embodiments, the transmission is narrowband due to the user equipment 135 being power limited. The indication may then be at least one of a channel quality measurement of the user equipment 135 and a power headroom of the user equipment 135.

According to some embodiments, the transmission is narrowband due to a data amount to be transmitted from the user equipment 135. The indication may then be a buffer status of the user equipment 135.

The embodiments of the base station 105 for handling a scheduling of a narrowband transmission from the user equipment 135 in the cell 110 served by the base station 105, may be implemented through one or more processors, such as a processor 620 in the base station 105 depicted in FIG. 6, together with computer program code for performing the actions of embodiments herein.

The program code mentioned above may also be provided as a computer program product, for instance in the form of a data carrier carrying computer program code for performing the embodiments herein when being loaded into the base station 105.

One such carrier may be in the form of a CD ROM disc. It is however feasible with other data carriers such as a memory stick. The computer program code may furthermore be provided as pure program code on a server and downloaded to the base station 105 e.g. remotely.

The base station 105 may further comprise a memory 630 comprising one or more memory units. The memory 630 is arranged to be used to store data such as for example the selected subframe, the power headroom, the channel quality measurement, and/or the buffer status. It may further be arranged to store applications to perform the actions of the embodiments herein when being executed in the base station 105.

The base station 105 may further comprise a receiver 640. The receiver 640 may be configured to receive the indication.

The base station 105 may further comprise a transmitter 650. The transmitter 650 may be configured to indicate to the user equipment an indication of the resource blocks it has been scheduled to.

The embodiments are not limited to the above-described embodiments. Various alternatives, modifications and equivalents may be used.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a base station for handling a scheduling of a narrowband transmission from a user equipment in a cell served by the base station, which base station and which user equipment are comprised in a cellular network, the method comprising:
dividing a time resource available for the scheduling into available subframes;
dividing a frequency resource available for scheduling in each respective subframe into available resource blocks;
selecting, from among the subframes of the time resource available for scheduling, a subframe in which narrowband transmissions are prioritized for scheduling; and
when an indication that the transmission from the user equipment is a narrowband transmission is obtained, scheduling the transmission from the user equipment to a subset of contiguous available resource blocks that i) are in the selected subframe which prioritizes narrowband transmissions, and ii) occupy a portion of the available frequency resource that has a better channel quality than other portions of the available frequency resource, wherein narrowband transmissions are prioritized for scheduling to the selected subframe based on the number of resource blocks they are to be scheduled to, and wherein the scheduling is based on a channel quality variation among available resource blocks in the selected subframe.

2. The method according to claim 1, wherein the indication is at least one of a channel quality measurement of the user equipment, a power headroom of the user equipment, a previous number of resource blocks used by the user equipment, and a buffer status of the user equipment.

3. The method according to claim 2, wherein the transmission is narrowband due to the user equipment being power limited, and wherein the indication is at least one of a channel quality measurement of the user equipment and a power headroom of the user equipment.

4. The method according to claim 2, wherein the transmission is narrowband due to a data amount to be transmitted from the user equipment, and wherein the indication is a buffer status of the user equipment.

5. The method according to claim 1, wherein the selecting is performed such that the selected subframe does not overlap a further selected subframe of a further cell comprised in the cellular network.

6. A base station for handling a scheduling of a narrowband transmission from a user equipment in a cell served by the base station, which base station and which user equipment are comprised in a cellular network, the base station comprising:

a processor and a memory, the processor being configured to:

(a) divide a time resource available for the scheduling into available subframes, (b) divide frequency resource available for scheduling in each respective subframe into available resource blocks, (c) select, from among the subframes of the time resource available for scheduling, a subframe in which narrowband transmissions are prioritized for scheduling; and (d) when an indication that the transmission from the user equipment is a narrowband transmission is obtained, schedule the transmission from the user equipment to a subset of contiguous available resource blocks that i) are in the selected subframe which prioritizes narrowband transmissions, and ii) occupy a portion of the available frequency resource that has a better channel quality than other portions of the available frequency resource, wherein narrowband transmissions are prioritized for scheduling to the selected subframe based on the number of resource blocks they are to be scheduled to, and wherein the scheduling is based on a channel quality variation among available resource blocks in the selected subframe.

7. The base station according to claim 6, wherein the indication is at least one of a channel quality measurement of the user equipment, a power headroom of the user equipment, a previous number of resource blocks used by the user equipment, and a buffer status of the user equipment.

8. The base station according to claim 7, wherein the transmission is narrowband due to the user equipment being power limited, and wherein the indication is at least one of a channel quality measurement of the user equipment and a power headroom of the user equipment.

9. The base station according to claim 7, wherein the transmission is narrowband due to a data amount to be transmitted from the user equipment, and wherein the indication is a buffer status of the user equipment.

10. The base station according to claim 6, wherein the processor is further configured to perform the selecting such that the selected subframe does not overlap a further selected subframe of a further cell comprised in the cellular network.

11. The method of claim 1, wherein only narrowband transmissions are scheduled to the selected subframe.

12. The method of claim 1, wherein at least two of the available subframes are adjacent to each other and are each divided into resource blocks of equal size.

13. The method according to claim 1, wherein the selected subframe for narrowband transmissions of cell-edge user equipments is prioritized over the subframe where cell-center user equipments are scheduled.

14. The base station according to claim 6, wherein the selected subframe for narrowband transmissions of cell-edge user equipments is prioritized over the subframe where cell-center user equipments are scheduled.

* * * * *